United States Patent Office 3,226,360
Patented Dec. 28, 1965

3,226,360
PROCESS OF PREPARING LINEAR COPOLYESTERS OF PHOSPHORIC ACID
Anthony Arthur Briarly Browne and John Mather, Harrogate, England, assignors to Imperial Chemical Industries Limited, London, England, a corporation of Great Britain
No Drawing. Filed Apr. 11, 1960, Ser. No. 22,080
Claims priority, application Great Britain, May 12, 1959, 16,270
6 Claims. (Cl. 260—47)

This invention relates to new copolyesters, in particular to new linear copolyesters of phosphoric acid.

According to the present invention we provide a process for the preparation of linear copolyesters characterised in that an ester of a dicarboxylic acid and a diol is reacted with a diaryl metal phosphate having the structural formula

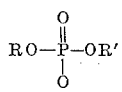

where R and R' are aryl radicals and M is a metal cation, and the products of this reaction are polycondensed. Copolyesters prepared according to our process are generally composed of the structural units

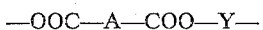

and

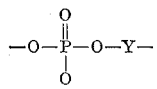

where A is an organic linkage and Y is the residue from the diol component HO—Y—OH.

The aryl groups R and R' may, however, carry substituents and these substituents may be of such a character that they can participate in the polymer forming reaction. Thus if the group R and R' are carboxyphenyl or carboalkoxyphenyl groups the copolyester is composed of the structural units

—OOC—A—COO—Y— and

either alone or together with varying numbers of the units

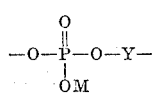

Among metal cations forming salts of phosphoric acid are metals of various valencies such as alkali metals and alkaline earth metals including magnesium. The residue Y is most commonly polymethylene but a wide range of diols including those containing branched chains such as a 2,2-dialkyl 1,3-propanediol, alicyclic glycols such as di(p-hydroxymethyl)cyclohexane and aromatic diols such as di(p-hydroxymethyl)benzene may be used in forming these copolyesters.

We prefer that our copolyesters should be composed of the structural units

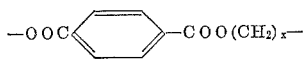

and

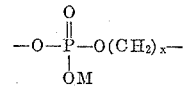

where M is a metal forming a salt of the phosphoric acid and $x$ is an integer from 2 to 10 inclusive. Such copolyesters are obtained when a di($\omega$-hydroxyalkyl)terephthalate is reacted with a diaryl metal phosphate. Di($\omega$-hydroxyalkyl) terephthalates may themselves be prepared by ester-interchange between a dialkyl terephthalate and a diol of the series $HO(CH_2)_xOH$ where $x=2$ to 10 inclusive or by any other method known in the art. The copolyester formation is most effectively carried out in the presence of a metal-containing ester-interchange catalyst and the metal of the phosphate may act in this way. It is also possible to utilise the metal catalyst which propagates the production of a di($\omega$-hydroxyalkyl) terephthalate from a dialkyl terephthalate and a diol to form a phosphate salt in situ. This is best illustrated by ester-interchange between a dialkyl terephthalate and a diol catalysed by an alkali metal compound on completion of which there is added, in amount equivalent to the metal, a substance having the formula

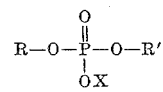

where X is a cation which can be replaced by the alkali metal to form an alkali metal phosphate which then reacts to form the copolyester. The cation X is most commonly hydrogen. This technique allows very rapid rates of ester-interchange to be achieved since quite large amounts of metal containing catalyst may be used.

When a di($\omega$-hydroxyalkyl)terephthalate is reacted with a di(carboxyphenyl)phosphate or a di(carboalkoxyphenyl)phosphate, interaction can, as already indicated, take place at both the carboxylate and phosphate linkages. In the normal way there is formed a mixture of the structural units (a) 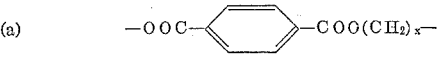

(b) 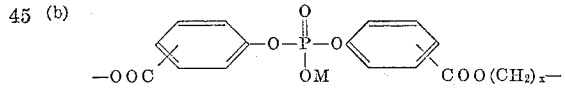

and (c) 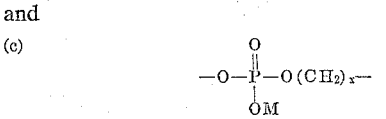

The proportions in which the phosphorus-containing components (b) and (c) are formed appears to depend on the ratio of phosphate to terephthalate and on the reaction conditions. In making these copolyesters of di(carboxyphenyl)phosphates and derivatives thereof, di(p-carboxylphenyl)phosphates are preferred since the polymer chains are then capable of tight packing resulting in a high degree of orientation.

We have found that best results are obtained when low concentrations of phosphate are used and the diol ester of the dicarboxylic acid is first polymerised to a low polymer before the phosphate is introduced. In this way the risk of disproportionation of the metal phosphates, e.g. two molecules of metal diaryl phosphate forming dimetal aryl phosphate and triaryl phosphate, is minimised.

The polymers of our invention are a source of useful shaped articles such as fibres and films, the presence of the phosphorus-containing components conferring on the copolyesters a good affinity for basic and dispersed acetate dyestuffs. Polymeric polymethylene terephthalates modified by the introduction of minor amounts of phosphate are of special interest and it has been found that when up to 10% of the ethylene terephthalate units of polyethylene terephthalate are replaced by phosphate units the valuable characteristics of the parent polyester, such as high softening point and resistance to degradation, are to a great extent retained.

Free phosphoric acid groups may be generated in the copolyesters or in shaped articles made therefrom by treatment with an acid reagent capable of interaction with the metal phosphate. The metal cation may also be replaced by other metallic and non-metallic cations. This is, of course, a mechanism by which dyestuffs can be attached to the polymer.

The following examples illustrate but do not limit our invention:

Example 1

Dimethyl terephthalate (120 parts) ethylene glycol (98 parts), zinc acetate (0.018 part) and antimony trioxide (0.024 part) were heated under a short fractionating column so that methanol was continuously separated from the reaction. On completion of ester-interchange, excess glycol was distilled off leaving a residue, consisting essentially of di($\beta$-hydroxyethyl)terephthalate.

This residue (93.5 parts) was intimately mixed with sodium diphenyl phosphate (3.4 parts) and heated at 280° C. and 0.2 mm. for 60 minutes to give a clear copolyester having melting point 250–255° C. from which filaments having a good affinity for basic dyestuffs, such as methylene blue, could be formed.

Example 2

Dimethyl terephthalate (120 parts), ethylene glycol (98 parts), zinc acetate (0.018 part) and antimony trioxide (0.024 part) were heated under a short fractionating column such that methanol was continuously distilled from the melt. At the completion of the ester-interchange reaction, excess ethylene glycol was distilled off and the pressure reduced to 0.2 mm. over 20 minutes. The low polymer was allowed to cool under nitrogen.

The low polymer (18.7 parts) was intimately ground with sodium di(p-carbomethoxy phenyl)phosphate (0.97 part) and heated at 280° C. and 0.2 mm. for 80 minutes to give a clear fibre-forming polymer having melting point 255–258° C. The fibres had good affinity for basic dyestuffs such as the quaternary ammonium type.

Examination of the products of hydrolysis of this copolymer showed the presence of a substantial amount of p-hydroxybenzoic acid.

Example 3

1,2-di(p-carbomethoxy phenoxy)ethane (100 parts), ethylene glycol (10 parts), zinc acetate (0.02 part) and antimony oxide (0.024 part) were heated under a short fractionating column so that methanol was continuously separated from the reaction. On completion of ester-interchange, excess glycol was distilled off and the residue, consisting mainly of low polymer, was allowed to cool under nitrogen.

The residue was intimately mixed with calcium diphenyl phosphate (4 parts) and heated at 280° C. and 0.2 mm. for 60 minutes to give a clear polyester having a melting point 230–235° C. from which filaments having a good affinity for basic and dispersed dyestuffs could be formed.

Example 4

Dimethyl terephthalate (120 parts), 1,4-di-hydroxymethyl cyclohexane (containing 80% of the trans isomer (230 parts)), and butyl titanate (0.5 part) were heated under a short fractionating column so that methanol was continuously separated from the reaction. The product was then heated at 260° so that excess 1,4-di-hydroxymethyl cyclohexane distilled off. The residue was allowed to cool under nitrogen.

The residue was intimately mixed with potassium diphenyl phosphate (5 parts) and heated at 310° C. for 60 minutes to give a clear polyester having a melting point 270–275° C. from which filaments having a good affinity for basic dyestuffs could be formed.

Example 5

Dimethyl terephthalate (120 parts) and ethylene glycol (97 parts) were reacted over the temperature range 150–210° C. in the presence of anhydrous sodium acetate (1.27 parts). The calculated amount of methanol was very rapidly liberated. Diphenyl hydrogen phosphate (3.86 parts) was then introduced and polycondensation carried out at 275° C. and 0.2 mm. mercury pressure. After 2 hours polyethylene terephthalate having intrinsic viscosity (1%, o-chlorophenol, 25° C.)=0.50 and softening point 258° C. was obtained. This polyester was melt spun at 285° C. to yield filaments having good affinity for quaternary ammonium dyestuffs. The filaments could be woven to give fabrics having good resistance to pilling.

What we claim is:

1. A process for the preparation of linear film- and fiber-forming copolyesters which comprises
    reacting (1) a bis ester of a dicarboxylic acid and a diol with (2) the ester groups of a metal (diaryl phosphate),
    and thereafter polycondensing the products of this reaction whereby said linear film- and fiber-forming copolyester is produced having a minor amount of metal phosphate radicals as units of the resulting polymeric chain,
    said metal phosphate radicals representing not more than 10 percent of the total units in said copolyester,
    and wherein the metal is selected from the group consisting of alkali and alkaline earth metals.

2. A process according to claim 1 wherein said ester of a dicarboxylic acid and a diol is a di($\omega$-hydroxyalkyl)terephthalate.

3. A process according to claim 2 wherein the di($\omega$-hydroxyalkyl)terephthalate is di($\beta$-hydroxyethyl)terephthalate.

4. A process according to claim 3 in which the molar ratio of di($\beta$-hydroxyethyl)terephthalate to metal (diaryl phosphate) is at least 9:1.

5. A process according to claim 1 wherein said ester of a dicarboxylic acid and a diol is a di($\omega$-hydroxyalkyl) ester of 1,2-di(p-carboxyphenoxy)ethane.

6. A process according to claim 1 wherein said ester of a dicarboxylic acid and a diol is the bis ester of 1,4-di-hydroxymethyl cyclohexane and terephthalic acid.

References Cited by the Examiner

UNITED STATES PATENTS

| | | | |
|---|---|---|---|
| 2,437,046 | 3/1948 | Rothrock et al. | 260—75 |
| 3,028,366 | 4/1962 | Engle | 260—75 |
| 3,052,653 | 9/1962 | Iannicelli | 260—75 |

FOREIGN PATENTS

| | | |
|---|---|---|
| 568,816 | 12/1958 | Belgium. |
| 1,172,893 | 10/1958 | France. |
| 588,833 | 6/1947 | Great Britain. |
| 802,921 | 10/1958 | Great Britain. |

WILLIAM H. SHORT, *Primary Examiner.*

PHILLIP E. MANGAN, HAROLD N. BURSTEIN, *Examiners.*

LOUISE P. QUAST, *Assistant Examiner.*